United States Patent
Zhu

(10) Patent No.: US 12,223,221 B2
(45) Date of Patent: Feb. 11, 2025

(54) SCREEN PROJECTION METHOD AND APPARATUS, ELECTRONIC DEVICE AND COMPUTER READABLE STORAGE MEDIUM

(71) Applicant: ZTE CORPORATION, Guangdong (CN)

(72) Inventor: Yunlong Zhu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 18/019,853

(22) PCT Filed: Jul. 6, 2021

(86) PCT No.: PCT/CN2021/104752
§ 371 (c)(1),
(2) Date: Feb. 6, 2023

(87) PCT Pub. No.: WO2022/028189
PCT Pub. Date: Feb. 10, 2022

(65) Prior Publication Data
US 2023/0333800 A1   Oct. 19, 2023

(30) Foreign Application Priority Data
Aug. 5, 2020  (CN) .......................... 202010777220.0

(51) Int. Cl.
*G06F 3/14* (2006.01)
*H04L 67/06* (2022.01)

(52) U.S. Cl.
CPC ............ *G06F 3/1454* (2013.01); *H04L 67/06* (2013.01)

(58) Field of Classification Search
CPC ..... G06F 3/1454; G06F 16/909; H04L 67/06; H04L 67/30
See application file for complete search history.

(56) References Cited

U.S. PATENT DOCUMENTS

| 2018/0241609 | A1 | 8/2018 | Rombakh et al. |
| 2018/0375955 | A1* | 12/2018 | Ferenczi ............... H04L 63/102 |
| 2019/0320219 | A1* | 10/2019 | Yoden ................... G06F 3/0488 |

FOREIGN PATENT DOCUMENTS

| CN | 108810594 A | 11/2018 |
| CN | 108989879 A | 12/2018 |

(Continued)

OTHER PUBLICATIONS

WIPO, International Search Report issued on Oct. 11, 2021.
Japan Patent Office, JP2022-572724 First Office Action issued on Jan. 9, 2024.

*Primary Examiner* — Amit Chatly
(74) *Attorney, Agent, or Firm* — Li & Cai Intellectual Property (USA) Office

(57) ABSTRACT

The present disclosure discloses a screen projection method, a screen projection apparatus, an electronic device, and a computer-readable storage medium. The screen projection method includes: sending a search file to search a client, the search file including an equipment identification and configuration parameters of a server, the configuration parameters of the server including parameters for selecting a target client; receiving a search response message returned by the client, the search response message including an equipment identification and equipment parameters of the client; determining the target client meeting a screen projection condition according to the search response message; and sending a screen projection file to the target client.

7 Claims, 3 Drawing Sheets

(56) References Cited

FOREIGN PATENT DOCUMENTS

| CN | 110602087 | A | 12/2019 |
|---|---|---|---|
| CN | 111427527 | A | 7/2020 |
| JP | 2012019413 | A | 1/2012 |
| JP | 2015165669 | A | 9/2015 |

* cited by examiner

SCREEN PROJECTION METHOD AND APPARATUS, ELECTRONIC DEVICE AND COMPUTER READABLE STORAGE MEDIUM

CROSS-REFERENCE TO RELATED APPLICATIONS

The present application claims the priority of Chinese Patent Application No. 202010777220.0, filed on Aug. 5, 2020, the contents of which are incorporated herein in their entirety by reference.

TECHNICAL FIELD

The present disclosure relates to the technical field of Internet and intelligent terminals, and in particular, to a screen projection method, a screen projection apparatus, an electronic device, and a computer-readable storage medium.

BACKGROUND

Screen projection refers to projecting media files on an apparatus to another apparatus for playing/displaying the media files on such another apparatus. For example, videos or images on a current mobile phone are projected onto another mobile phone, a computer or a smart television for playing/displaying the videos or the images, so that users can watch the videos or the images on the current mobile phone through the another mobile phone, the computer or the smart television.

At present, the screen projection depends on transmission of videos or images through a connection between a server and a client, transmission parameters are parsed in a transmission process of video streams, which may cause some display problems; in addition, a problem that the client is not a screen-projection object may occur, i.e., an equipment which is not to accept screen projection may a receive a screen projection file, which results in a waste of network resources.

SUMMARY

In a first aspect, the present disclosure provides a screen projection method, including: sending a search file to search a client, the search file including a randomly generated equipment identification and configuration parameters of a server, the configuration parameters of the server including parameters for selecting a target client; receiving a search response message returned by the client, the search response message including an equipment identification and equipment parameters of the client; determining the target client meeting a screen projection condition according to the search response message; and sending a screen projection file to the target client.

In a second aspect, the present disclosure provides a screen projection method, including: monitoring a search file sent by a server, the search file including a randomly generated equipment identification and configuration parameters of the server, the configuration parameters of the server including parameters for selecting a target client; in response to that the search file is monitored, generating and returning a search response message to the server based on the search file, the search response message including an equipment identification and equipment parameters of a client; and receiving a screen projection file sent by the server.

In a third aspect, the present disclosure provides a screen projection apparatus, including: a server sending module configured to send a search file to search a client, the search file including a randomly generated equipment identification and configuration parameters of a server, the configuration parameters of the server including parameters for selecting a target client; a server receiving module configured to receive a search response message returned by the client, the search response message including an equipment identification and equipment parameters of the client; a server determining module configured to determine the target client meeting a screen projection condition according to the search response message, and send a screen projection file to the target client.

In a fourth aspect, the present disclosure provides a screen projection apparatus, including: a client receiving module configured to receive a search file sent by a server, the search file including a randomly generated equipment identification and configuration parameters of the server, the configuration parameters of the server including parameters for selecting a target client; a search response generation module configured to generate a search response message based on the search file in response to that the search file is monitored, the search response message including an equipment identification and equipment parameters of a client; and a client sending module configured to return the search response message to the server, where the client receiving module is further configured to receive a screen projection file sent by the server.

In a fifth aspect, the present disclosure provides an electronic device, including: at least one processor; a memory having at least one computer program stored thereon, the at least one computer program, when executed by the at least one processor, causes the at least one processor to implement any method described above; and at least one I/O interface connected between the processor and the memory, and configured to implement information interaction between the processor and the memory.

In a sixth aspect, the present disclosure provides a computer-readable storage medium having at least one computer program stored thereon, the computer program, when executed by a processor, causes the processor to implement any method described above.

DETAILED DESCRIPTION

In order to make those skilled in the art better understand the technical solutions of the present disclosure, a screen projection method, a screen projection apparatus, an electronic device, and a computer-readable storage medium provided in the present disclosure are further described in detail below with reference to the accompanying drawings.

Exemplary embodiments are described in detail below with reference to the accompanying drawings, but may be embodied in different forms, and should not be construed as a limitation. The embodiments are illustrated merely for those skilled in the art fully understanding the scope of the present disclosure.

As used herein, a term "and/or" includes any and all combinations of one or more of listed items.

The terms used in the present disclosure are for a purpose of describing particular embodiments only, and are not intended to limit the present disclosure. As used in the present disclosure, singular forms "a" and "the" are intended to include plural forms as well, i.e., to represent at least one, unless the context clearly defines otherwise. It should further be understood that terms "includes" and/or "made of" in the present disclosure are used to specify a presence of at least one of recited features, integers, steps, operations, elements or components, but may not preclude a presence or an addition of at least one of other features, integers, steps, operations, elements, components or groups thereof.

Unless otherwise defined, meanings of all terms (including technical terms and scientific terms) used herein are same as meanings commonly understood by one of ordinary skill in the art. It should further be understood that terms, such as those defined in common dictionaries, should be construed as having a meaning that is consistent with that in background of the existing art and the present disclosure, and should not be construed as having an idealized or over-formal meaning, unless expressly defined in the present disclosure.

Before screen projection is performed between apparatuses, a server connects with a client, and then sends a screen projection file to the client, so that the client performs screen projection. Because a configuration file is sent to the client along with the screen projection file, the server cannot control the client, so that some clients may receive the screen projection file unnecessarily, and network resources are wasted.

In followings, the server may also be referred to as a sending terminal, and the client may also be referred to as a receiving terminal. The server sends a screen projection file, and the client receives and plays/displays the screen projection file.

Figure 1:
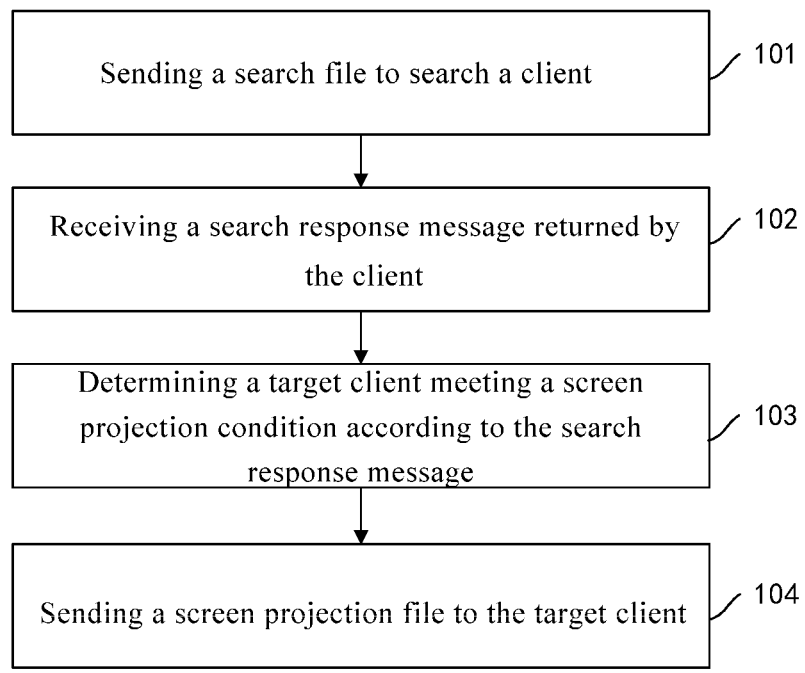
FIG. 1 is a flowchart of a screen projection method according to the present disclosure.

In a first aspect, the present disclosure provides a screen projection method, applied to a server, i.e., a terminal providing a screen projection file. FIG. 1 is a flowchart of a screen projection method according to the present disclosure. As shown in FIG. 1, the screen projection method may include following operations 101 to 104.

At operation 101, sending a search file to search a client.

The search file includes an equipment identification and configuration parameters of the server, the equipment identification of the server may be randomly generated, and the configuration parameters of the server include parameters for selecting a target client, i.e., the server may select the target client according to the configuration parameters. Certainly, in some implementations, the equipment identification of the server may be generated according to a preset rule.

In some implementations, in order to connect with each other, the server and the client generate an equipment identification (i.e., id) respectively, and transmit the equipment identification (id) to the other in a search stage.

In some implementations, the server may randomly generate the id, and a generation manner of the id may adopt an existing manner, which is not limited in the disclosure. After generating the id, the server generates the search file according to the id and the configuration parameters. The configuration parameters may be manually inputted or automatically generated through a background.

In some implementations, the configuration parameters may include regional characteristics, clients may be screened by the regional characteristics, and the clients from specific regions may be excluded, or only the clients from specific regions may be selected. For example, if any regional characteristic is set to be a characteristic indicating to connect with a region A, after the server sends the search file, only the client in the region A can receive the search file and connects with the server. In other words, the configuration parameters are equivalent to a screening mechanism, and some clients are shielded in advance in a connection establishment stage, so that network resources to be occupied can be reduced in a subsequent process of transmitting the screen projection file.

In some implementations, a client list may be generated according to configuration parameters of clients, i.e., the client list may be generated according to equipment parameters and equipment identifications of the clients, and the client list may be a list in a preset priority order, and includes at least one client, a priority of each client may be set according to a region where the client is located, for example, a priority of each client in an area A is high, a priority of each client in an area B is medium, and a priority of each client in an area C is low. In some implementations, the target client is selected from the client list according to the configuration parameters of the server, so that the clients each with a lower priority can be shielded, an effect of differential configuration is achieved, and network resources subsequently occupied are reduced.

In some implementations, the server may rank priorities of clients according to equipment parameters of the clients. For example, any client unsuitable for displaying is set to be at a low priority, and the client suitable for displaying is set to be at a high priority. The client list is generated according to priorities of the clients. The server may screen the clients in the connection establishment stage, and shield the clients each with a lower priority.

In some implementations, the configuration parameters of the server may include an equipment type, i.e., an equipment type of the server, the configuration parameters are adjusted according to the equipment type, fixed parameters in a subsequent process of data interaction are dynamically increased or deleted, and the server actively shields any inappropriate client, or lowers the priority of the inappropriate client, so that an effect of differential configuration is achieved, and network resources subsequently occupied are reduced.

In some implementations, the configuration parameters of the server may include at least one of a system version, a screen size, or a resolution. The server may send the system version, the screen size or the screen projection resolution of the server to the client in the search stage, the client may determine, whether or not it supports a screen projection request of the server, according to the system version, and may adjust a screen size and a resolution of a display equipment of the client according to the screen size and the resolution included in the configuration parameters. The system version refers to a version of an operation system, for example, for any mobile phone, the system version may be any of various versions of an Android system.

It should be noted that the search file may include the equipment identification and the configuration parameters, the equipment identification is a unique identification of the equipment corresponding to the server, and the client may determine the server according to the equipment identification of the server. The configuration parameters include at least one of a screen size, a resolution, a system version, or a regional characteristic.

At operation 102, receiving a search response message returned by the client.

The search response message may include an equipment identification and equipment parameters of the client. The equipment identification is a unique identification of the equipment used by the client, and the configuration parameters include at least one of a screen size, a resolution, a system version, or a regional characteristic.

In some implementations, after receiving the search file sent by the server, the client identifies the equipment identification and the configuration parameters of the server, determines whether an equipment of the client supports displaying of the server, and returns the search response message.

In some implementations, after receiving the search file sent by the server, the client determines whether an equipment of the client supports displaying of a screen projection file, and in response to that the displaying is supported, returns a message indicating that matching between id(s) is successful to the server; or in response to that the displaying is not supported, returns a message indicating that matching between id(s) is unsuccessful to the server.

At operation 103, determining a target client meeting a screen projection condition according to the search response message.

In some implementations, the search response message returned by the client includes the message indicating that the matching is successful or unsuccessfully, in response to that the search response message is the message indicating that the matching is successful, the client corresponding to the search response message is determined to be the target client meeting the screen projection condition, and in response to that the search response message is the message indicating that the matching is unsuccessfully, the client corresponding to the search response message is determined to be not meeting the screen projection condition.

In some implementations, the server and the client may implement pre-decoding, i.e., appoint a communication mode, in the search stage according to system versions and equipment parameters of the server and the client, so as to avoid parsing the configuration parameters in a transmission process of the screen projection file, and improve efficiency and effect of screen projection.

After the client returns the message indicating that the matching is successful to the server, the server and the client finish an earlier-stage work of screen projection. The server can send the screen projection file to the client, and the client receives and plays/displays the screen projection file.

At operation 104, sending a screen projection file to the target client.

In some implementations, the screen projection file includes any suitable file such as a video or an image, and in response to that the server is to project an image on the client, the server sends an image stream to the client, and in response to that the server is to project a video on the client, the server sends a video stream to the client.

In some implementations, after operation 102, the screen projection method may further include: storing the equipment identification of the client, so that the server conveniently obtains the equipment identification of the client as desired.

The screen projection method provided in the present disclosure includes: sending a search file to search a client, the search file including an equipment identification and configuration parameters of a server, the configuration parameters of the server including parameters for selecting a target client; receiving a search response message returned by the client, the search response message including an equipment identification and equipment parameters of the client; determining the target client meeting a screen projection condition according to the search response message; and sending a screen projection file to the target client, where the server transmits the equipment identification and the configuration parameters of the server to the client in the search stage, selects the target client to be subjected to screen projection through the configuration parameters, i.e., only the client selected can receive screen projection, a differentiation of configuration parameters is achieved, and a pre-decoding of transmission parameters is implemented in the search stage, the transmission parameters are not to be parsed in a process of transmitting a video file, and a stability of screen projection and user's experiences are improved.

Figure 2:
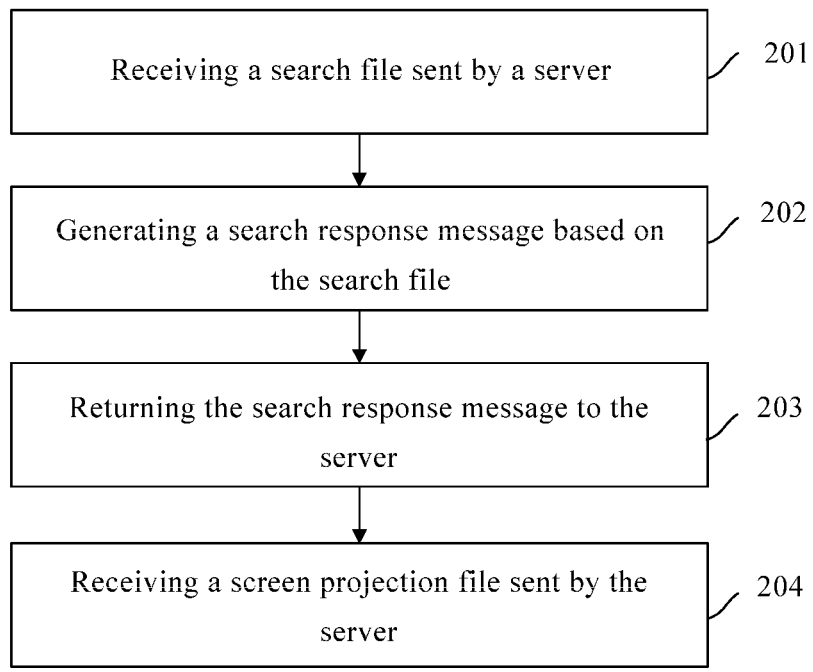
FIG. 2 is a flowchart of a screen projection method according to the present disclosure.

In a second aspect, the present disclosure provides a screen projection method, applied to a client, i.e., a terminal accepting screen projection. FIG. 2 is a flowchart of a screen projection method according to the present disclosure. As shown in FIG. 2, the screen projection method includes following operations 201 to 204.

At operation 201, receiving a search file sent by a server.

The search file includes an equipment identification and configuration parameters of the server, the equipment identification of the server may be randomly generated, and the configuration parameters of the server include parameters for selecting a target client, i.e., the server may select the target client according to the configuration parameters.

In some implementations, in order to connect with each other, the server and the client generate an equipment identification (i.e., id) respectively, and transmit the equipment identification (id) to the other in a search stage.

In some implementations, the server may randomly generate the id, and a generation manner of the id may adopt an existing manner, which is not limited in the disclosure. After generating the id, the server generates the search file according to the id and the configuration parameters. The configuration parameters may be manually inputted or automatically generated through a background.

In some implementations, the configuration parameters may include regional characteristics, clients may be screened by the regional characteristics, and the clients from specific regions may be excluded, or only the clients from specific regions may be selected. For example, if any regional characteristic is set to be a characteristic indicating to connect with a region A, after the server sends the search file, only the client in the region A can receive the search file and connects with the server. In other words, the configuration parameters are equivalent to a screening mechanism, and some clients are shielded in advance in a connection establishment stage, so that network resources to be occupied can be reduced in a subsequent process of transmitting the screen projection file.

In some implementations, a client list may be generated according to configuration parameters of clients, and the client list may be a list in a preset priority order, and includes at least one client, for example, a priority of each client in an area A is high, a priority of each client in an area B is medium, and a priority of each client in an area C is low. In some implementations, the target client is selected from the client list according to the configuration parameters of the server, so that the clients each with a lower priority are shielded, an effect of differential configuration is achieved, and network resources subsequently occupied are reduced.

In some implementations, the configuration parameters of the server may include an equipment type, i.e., an equipment type of the server, the configuration parameters are adjusted according to the equipment type, fixed parameters in a subsequent process of data interaction are dynamically increased or deleted, and the server actively shields an inappropriate client, or lowers a priority of the inappropriate client, so that an effect of differential configuration is achieved, and network resources subsequently occupied are reduced.

In some implementations, the configuration parameters of the server may include at least one of a system version, a screen size, or a resolution. The server may send the system version, the screen size or the screen projection resolution of the server to the client in the search stage, the client may determine whether or not it supports a screen projection request of the server according to the system version, and may adjust a screen size and a resolution of a display equipment of the client according to the screen size and the resolution included in the configuration parameters. The system version refers to a version of an operation system, for example, for any mobile phone, the system version may be any of various versions of an Android system.

It should be noted that the search file may include the equipment identification and the configuration parameters of the server, the equipment identification is a unique identification of the equipment corresponding to the server, and the client may determine the server according to the equipment identification of the server. The configuration parameters include at least one of a screen size, a resolution, a system version, or a regional characteristic.

In some implementations, the server sends the search file to the client in the search stage, and because the server sets the configuration parameters, only the client designated by the server receives the search file. After receiving the search file in the search stage, the client connects with the server, and appoints a communication mode, i.e., mutual transmission of terminal parameters is implemented in the search stage, so that a display problem of mutual projection between differentiated terminal screens is effectively solved and avoided.

At operation 202, generating a search response message based on the search file.

The search response message includes an equipment identification and equipment parameters of the client. The equipment identification of the client is a unique identification used to represent the client.

In some implementations, after monitoring the search file sent by the server, the client identifies the equipment identification and the equipment parameters of the server, determines whether an equipment of the client supports corresponding displaying, and returns the search response message.

In some implementations, after receiving the search file sent by the server, the client determines whether or not an equipment of the client supports displaying of an screen projection file, and in response to that the displaying is supported, returns a message indicating that matching between id(s) is successful to the server; in response to that the displaying is not supported, returns a message indicating that matching between id(s) is unsuccessful to the server. In some implementations, the client determines whether or not an equipment of the client supports displaying of a screen projection file according to the configuration parameters of the server.

At operation 203, returning the search response message to the server.

In some implementations, the search response message returned to the server includes a message indicating that the matching is successful or unsuccessful, and in response to that the search response message is the message indicating that the matching is successful, the client corresponding to the search response message is the target client meeting the screen projection condition, and in response to that the search response message is the message indicating that the matching is unsuccessful, the client corresponding to the search response message is not the target client meeting the screen projection condition.

In some implementations, the server and the client may implement pre-decoding, i.e., appoint a communication mode, in the search stage according to system versions and equipment parameters of the server and the client, so as to avoid parsing the configuration parameters in a transmission process of the screen projection file, and improve efficiency and effect of screen projection.

After the message indicating that the matching is successful is returned to the server, the server and the client finish an earlier-stage work of screen projection. The server can send the screen projection file to the client, and the client receives and plays/displays the screen projection file.

At operation 204, receiving a screen projection file sent by the server.

In some implementations, the screen projection file includes a video or an image, and in response to that the server is to project an image on the client, the server sends an image stream to the client, and in response to that the server is to project a video file on the client, the server sends a video stream to the client.

In some implementations, after receiving the screen projection file, the client plays/displays the screen projection file by using a display equipment.

Figure 3:
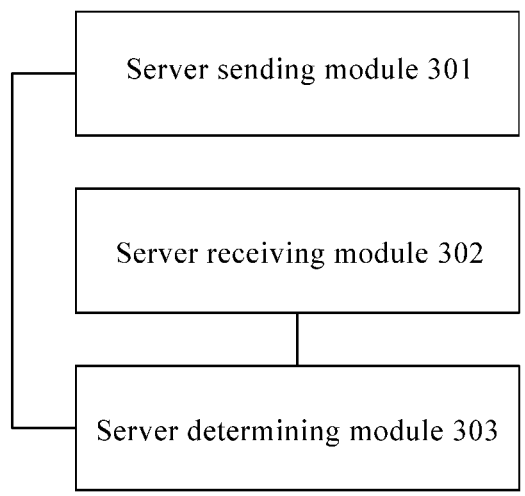
FIG. 3 is a schematic block diagram of a screen projection apparatus according to the present disclosure.

In a third aspect, the present disclosure provides a screen projection apparatus, applied to a server. FIG. 3 is a schematic block diagram of a screen projection apparatus according to the present disclosure. As shown in FIG. 3, the screen projection apparatus includes a server sending module 301, a server receiving module 302, and a server determining module 303.

The server sending module 301 is configured to send a search file to search a client.

In some implementations, the search file is a file generated by a server generation module. The search file includes a randomly generated equipment identification and configuration parameters of the server, the configuration parameters are used for selecting a target client meeting a condition. Certainly, in some implementations, the equipment identification of the server may be generated according to a preset rule.

In some implementations, in order to connect with each other, the server and the client generate an equipment identification (id) respectively, and transmit the equipment identification (id) to the other in a search stage.

In some implementations, the server may randomly generate the id, and a generation manner of the id may adopt an existing manner, which is not limited in the disclosure. After generating the id, the server generates the search file according to the id and the configuration parameters. The configuration parameters may be manually inputted or automatically generated through a background.

The configuration parameters of the server may include at least one of a screen size, a resolution, a system version, a regional characteristic, or an equipment type. Functions of the screen size, the resolution, the system version, the regional characteristic, and the equipment type may be referred to the description of operation 101, and are not repeated herein again.

The server receiving module 302 is configured to receive a search response message returned by the client.

The search response message may include an equipment identification and equipment parameters of the client. The equipment identification is a unique identification of the equipment used by the client, and the configuration parameters include at least one of a screen size, a resolution, a system version, or a regional characteristic In some implementations, after receiving the search file sent by the server, the client identifies the equipment identification and the configuration parameters of the server, determines whether an equipment of the client supports corresponding displaying, and returns the search response message.

In some implementations, after receiving the search file sent by the server, the client determines whether an equipment of the client supports displaying of a screen projection file, and in response to that the displaying is supported, returns a message indicating matching between id(s) is successful to the server; and in response to that the displaying is not supported, returns a message indicating matching between id(s) is unsuccessful to the server. In some implementations, the client determines whether or not an equipment of the client supports displaying of the screen projection file according to the configuration parameters of the server.

The server determining module 303 is configured to determine the client meeting a screen projection condition according to the search response message.

In some implementations, the search response message returned by the client includes the message indicating the matching is successful or unsuccessful, in response to that the search response message is the message indicating that the matching is successful, the client corresponding to the search response message is determined to be the target client meeting the screen projection condition, and in response to that the search response message is the message indicating that the matching is unsuccessful, the client corresponding to the search response message is determined to be not meeting the screen projection condition.

In some implementations, the server sending module 301 is further configured to send a screen projection file to the target client meeting the screen projection condition.

The screen projection file may include a video or an image, and correspondingly, the server sending module 301 sends a video stream or an image stream to the client.

In some implementations, the screen projection apparatus further includes a list generation module configured to generate a client list according to the configuration parameters of the client; the client list is a list of clients arranged according to priorities of the clients.

In some implementations, the screen projection apparatus further includes a storage module configured to store the equipment identification of the client.

In some implementations, the screen projection apparatus further includes a communication determining module configured to determine a communication mode according to the configuration parameters and the equipment parameters returned by the client.

In the screen projection apparatus provided in the present disclosure, the server sending module sends the search file to search the client; the search file includes the equipment identification and the configuration parameters of the server, the configuration parameters of the server include parameters for selecting the target client; the server receiving module receives the search response message returned by the client; the search response message includes the equipment identification and the equipment parameters of the client; the server determining module determines the target client meeting the screen projection condition according to the search response message; the server sending module sends the screen projection file to the target client, and the server transmits the equipment identification and the configuration parameters of the server to the client in the search stage, and selects the target client to be subjected to screen projection through the configuration parameters, that is, only the selected client can accept screen projection, a differentiation of configuration parameters is achieved, and a pre-decoding of transmission parameters is implemented in the search stage, the transmission parameters are not to be parsed in a process of transmitting a video file, and a stability of screen projection and user's experiences are improved.

Figure 4:
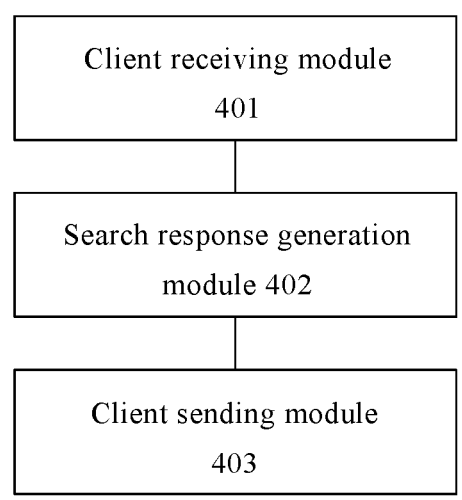
FIG. 4 is a schematic block diagram of a screen projection apparatus according to the present disclosure.

In a fourth aspect, the present disclosure provides a screen projection apparatus, applied to a client. FIG. 4 is a schematic block diagram of a screen projection apparatus provided in the present disclosure. As shown in FIG. 4, the screen projection apparatus includes a client receiving module 401, a search response generation module 402, and a client sending module 403.

The client receiving module 401 is configured to monitor a search file sent by a server.

The search file may include a randomly generated equipment identification and configuration parameters of the server, and the configuration parameters of the server are used to select a client meeting a condition.

In some implementations, in order to connect with each other, the server and the client generate an equipment identification (id) respectively, and transmit the equipment identification (id) to the other in a search stage.

The search response generation module 402 is configured to generate a search response message based on the search file in response to that the search file is monitored.

The search response message includes an equipment identification and equipment parameters of the client.

In some implementations, after receiving the search file sent by the server, the client identifies the equipment identification and the configuration parameters of the server, determines whether an equipment of the client supports corresponding displaying, and returns the search response message.

In some implementations, after receiving the search file sent by the server, the client determines whether an equipment of the client supports displaying of the screen projection file, and in response to that the displaying is supported, returns a message indicating that matching between id(s) is successful to the server; in response to that the displaying is not supported, returns a message indicating that matching between id(s) is unsuccessful to the server.

The client sending module 403 is configured to return the search response message to the server.

The client receiving module 401 is further configured to receive a screen projection file sent by the server.

In some implementations, the screen projection file includes a video or an image, and in response to that the server is to project an image on the client, the server sends an image stream to the client, and in response to that the server is to project a video on the client, the server sends a video stream to the client.

In some implementations, the screen projection apparatus further includes a display module configured to display the screen projection file on the client.

Figure 5:
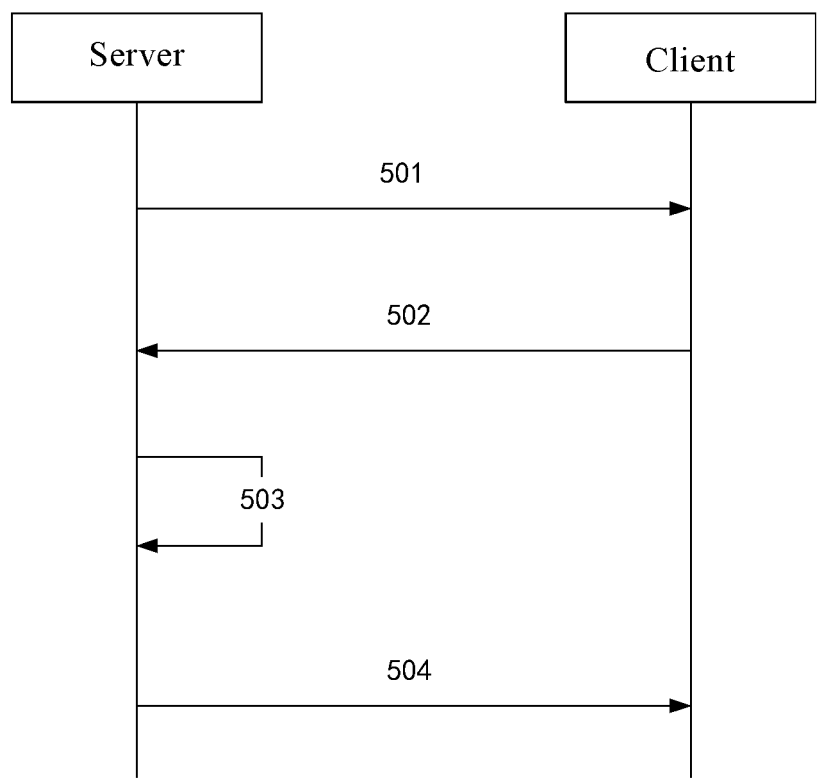
FIG. 5 is a flowchart of a screen projection method according to the present disclosure.

In the screen projection apparatus provided in the present disclosure, the client receiving module is configured to receive the search file sent by the server; the search file includes the randomly generated equipment identification and the configuration parameters of the server, and the configuration parameters of the server include the parameters for selecting the target client; the client sending module is configured to return the search response message to the server; the search response message includes the equipment identification and the equipment parameters of the client, the server transmits the equipment identification and the configuration parameters of the server to the client in the search stage, selects the target client to be subjected to screen projection through the configuration parameters, that is, only the selected client can accept screen projection, a differentiation of configuration parameters is achieved, and a pre-decoding of transmission parameters is implemented in the search stage, the transmission parameters are not to be parsed in a process of transmitting a video file, and a stability of screen projection and user's experiences are improved In order to better understand the screen projection method and the screen projection apparatus provided above, the screen projection method and the screen projection apparatus are further described below. As shown in FIG. 5, to implement screen projection, a server and a client perform following operations 501 to 504.

At operation 501, the server sends a search file to the client.

The server sends the search file to the client to search the client which can accept screen projection. The search file includes a randomly generated equipment identification and configuration parameters of the server, the configuration parameters may include parameters for selecting a target client.

At operation 502, the client returns a search response to the server.

The client returns a search response message to the server; the search response message includes an equipment identification and equipment parameters of the client.

At operation 503, the server stores the equipment identification of the client.

At operation 504, the server sends a screen projection file to the client.

The server sends the screen projection file to the client meeting a condition, the screen projection file includes a video or an image. In response to that the server is to project an image on the client, the server sends an image stream to the client. In response to that the server is to project a video on the client, the server sends a video stream to the client.

After the server connects with the client, the server and the client can perform data interaction and screen projection therebetween. If a screen size of the server is not sent to the client in the search stage, the client may send a request for obtaining the screen size to the server during data interaction, and the server sends the actual screen size to the client based on the request. Then, data for screen projection is to be transmitted.

In some implementations, the screen projection file may be an image or a video. The server may intercept an image through an Android Debug Bridge (ADB) command or acquire an image through an ImageReader of an Android system, and then transmit the image through a network. A video stream may be obtained by acquiring a screen stream through an operating system, and is transmitted after being encoded in H264, so that display thereof can be smoother. In the operating system, a system agent has a MediaCodec class and a VirtualDisplay class to read a screen stream and then convert it into a video stream encoded in H264.

In some implementations, the server receives information of image data transmitted by the client through a Socket, decompresses and displays the information of image data on a User Interface (UI), in response to that a user clicks the UI, a coordinate of a click position is obtained, and is converted into an actual coordinate through a scale conversion, and then a corresponding command is executed through the ADB, and a change of an image is transmitted to the client through the Socket in real time.

For a PC, an H264 encoded video stream of an android agent may be read and then decoded by using a FFMPEG library.

Firstly, a Web application program obtains the H264 encoded video stream of the android agent terminal through a socket on node.js, then transmits a byte array to WebRtc through the Websocket in real time, the byte array is displayed through a video tag of the WebRtc, then a coordinate event clicked by a mouse is obtained through the js, a subsequent operation is similar to that of the PC, i.e., a command is obtained and then executed, an AndroidClient projects a screen image, and the above process is repeated.

It should be noted that, all the modules referred to in the present disclosure are logical modules, and in practical applications, each logical module/component may be implemented by one physical component, or a part of one physical component, or a combination of multiple physical components. In addition, in order to highlight the innovative part of the present disclosure, components that are not so closely related to solving the technical problem proposed by the present disclosure are not introduced in the embodiments of the present disclosure, but it does not indicate that no other components are present in the embodiments of the present disclosure.

Figure 6:
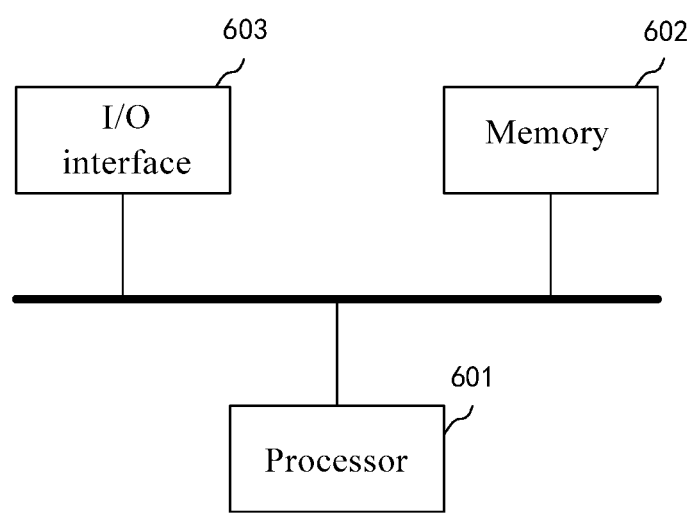
FIG. 6 is a schematic block diagram of an electronic device according to the present disclosure.

In a fifth aspect, referring to FIG. 6, the present disclosure provides an electronic device, including: at least one processor 601; a memory 602 having at least one program stored thereon, the at least one program, when executed by the at least one processor 601, causes the at least one processor 601 to perform the screen projection method described above; and at least one I/O interface 603, connected between the processor 601 and the memory 602, and configured to implement information interaction between the processor 601 and the memory 602.

The processor 601 is a device having a capability of processing data, which includes, but is not limited to, a Central Processing Unit (CPU), and the like; the memory 602 is a device having a capability of storing data, which includes, but is not limited to, a random access memory (RAM, in particular, SDRAM, DDR, and the like), a read only memory (ROM), an electrically erasable programmable read only memory (EEPROM), and a FLASH; and the I/O interface 603 is connected between the processor 601 and the memory 602, is configured to implement information interaction between the processor 601 and the memory 602, and includes, but is not limited to, a bus and the like.

In some implementations, the processor 601, the memory 602 and the I/O interface 603 are connected together through the bus, and are further connected to other components of a computing device.

In a sixth aspect, the present disclosure provides a computer-readable storage medium having a computer program stored therein, the computer program, when executed by a processor, causes the processor to perform the screen projection method described above.

It should be understood by those of ordinary skill in the art that all or some of the operations in the method, the functional modules/components in the apparatus and system disclosed above may be implemented as software, firmware, hardware, or suitable combinations thereof. In a hardware implementation, the division between the functional modules/components stated above does not correspond to the division of physical components; for example, one physical component may have a plurality of functions, or one function or operation may be performed through cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, the computer-readable medium may include computer storage medium (or non-transitory medium) and communication medium (or transitory medium). The computer storage medium includes volatile/nonvolatile or removable/non-removable medium used in any method or technology for storing information (such as computer-readable instructions, data structures, program modules and other data). The computer storage medium includes, but is not limited to, a Random Access Memory (RAM), a Read-Only Memory (ROM), an Electrically Erasable Programmable Read-Only Memory (EEPROM), a flash memory or other memory techniques, a Compact Disc Read-Only Memory (CD-ROM), a Digital Video Disk (DVD) or other optical discs, magnetic cassettes, magnetic tapes, magnetic disks or other magnetic storage devices, or any other medium which can be used to store the desired information and can be accessed by a computer. The communication medium generally includes computer-readable instructions, data structures, program modules or other data in a modulated data signal, such as a carrier wave or other transmission mechanism, and may include any information delivery medium.

The present disclosure discloses the exemplary embodiments, and although specific terms are employed, they are used and should only be interpreted in a generic and descriptive meaning and not for purposes of a limitation. It is apparent to those skilled in the art that features, characteristics and/or elements described in connection with specific embodiments may be used alone or in combination with features, characteristics and/or elements described in connection with other embodiments, unless explicitly stated otherwise. Therefore, it should be understood by those skilled in the art that various changes in form and details may be made without departing from the scope of the present disclosure as set forth in the appended claims.

What is claimed is:

1. A screen projection method, comprising:
    sending a search file to search a client, the search file comprising an equipment identification and configuration parameters of a server, the configuration parameters of the server comprising parameters for selecting a target client;
    receiving a search response message returned by the client, the search response message comprising an equipment identification and equipment parameters of the client;
    determining the target client meeting a screen projection condition according to the search response message; and
    sending a screen projection file to the target client,
    wherein the determining the target client meeting a screen projection condition according to the search response message comprises:
    generating a client list according to the equipment identification and the equipment parameters of the client, the client list comprising at least one client in a preset priority order;
    hiding the client with a lower priority from the client list; and
    determining the target client from the client list according to the configuration parameters of the server.

2. The method of claim 1, further comprising:
    after receiving the search response message returned by the client, determining a communication mode according to the configuration parameters of the server and the equipment parameters returned by the client, so that the server communicates with the client according to the communication mode.

3. The method of claim 1, wherein the determining the target client meeting a screen projection condition according to the search response message comprises:
    in response to that the search response message is a message indicating that a matching is successful, determining that the client corresponding to the search response message is the target client meeting the screen projection condition.

4. The method of claim 1, wherein the configuration parameters comprise at least one of:
    a screen size, a resolution, a system version, or a regional characteristic.

5. An electronic device, comprising:
    at least one processor;
    a memory having at least one computer program stored thereon, the at least one computer program, when executed by the at least one processor, causes the at least one processor to implement the method of claim 1; and
    at least one I/O interface connected between the processor and the memory, and configured to implement information interaction between the processor and the memory.

6. A non-transitory_computer-readable storage medium having at least one computer program stored thereon, the computer program, when executed by a processor, causes the processor to implement the method of claim 1.

7. A screen projection apparatus, comprising:
    a server sending module configured to send a search file to search a client, the search file comprising a randomly generated equipment identification and configuration parameters of the server, the configuration parameters of the server comprising parameters for selecting a target client;
    a server receiving module configured to receive a search response message returned by the client, the search response message comprising an equipment identification and equipment parameters of the client;
    a server determining module configured to determine the target client meeting a screen projection condition according to the search response message,
    wherein the server determining module is further configured to send a screen projection file to the target client,
    wherein the determining the target client meeting a screen projection condition according to the search response message comprises:

generating a client list according to the equipment identification and the equipment parameters of the client, the client list comprising at least one client in a preset priority order;
hiding the client with a lower priority from the client list; and
determining the target client from the client list according to the configuration parameters of the server.

* * * * *